United States Patent Office 3,552,215
Patented Jan. 5, 1971

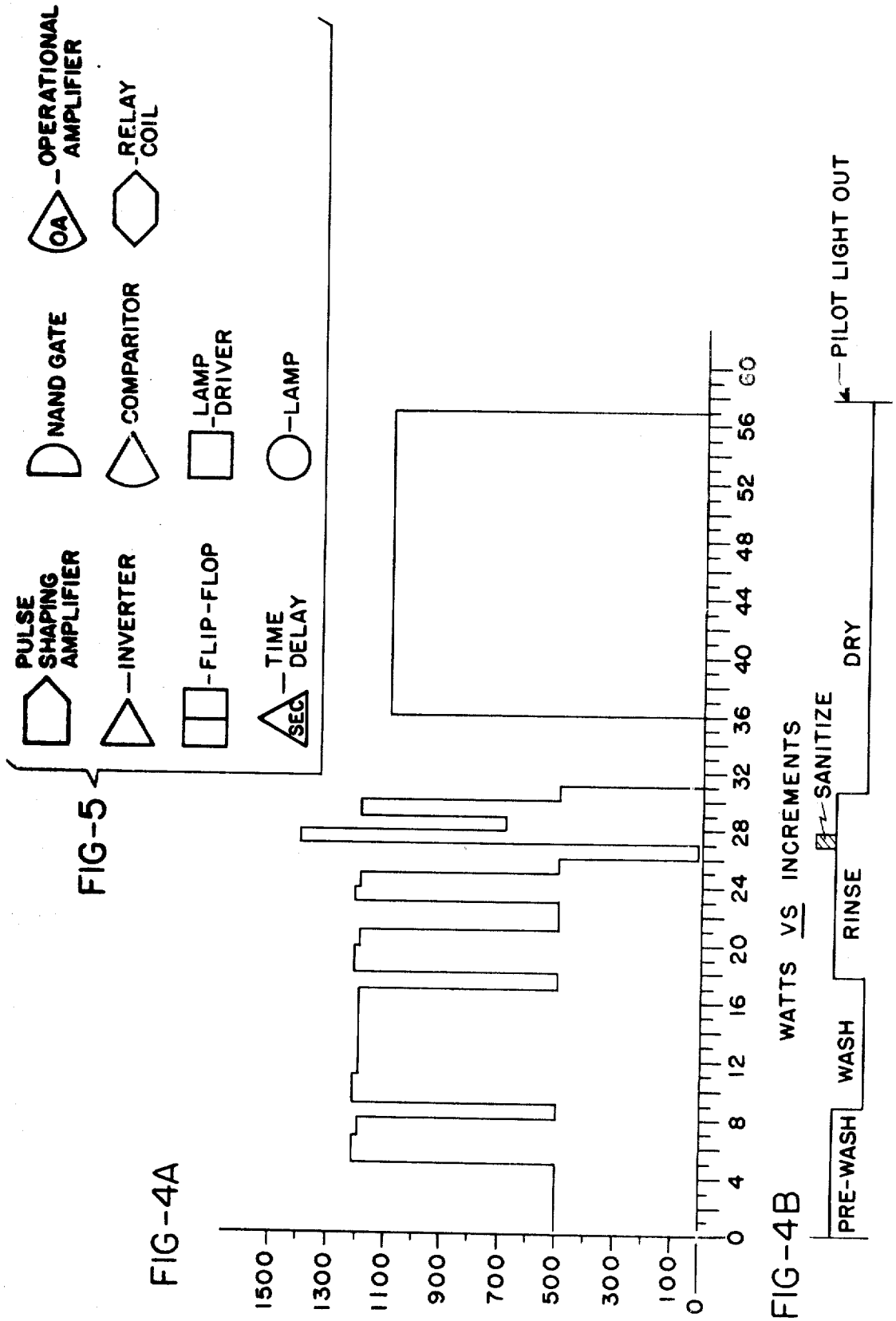

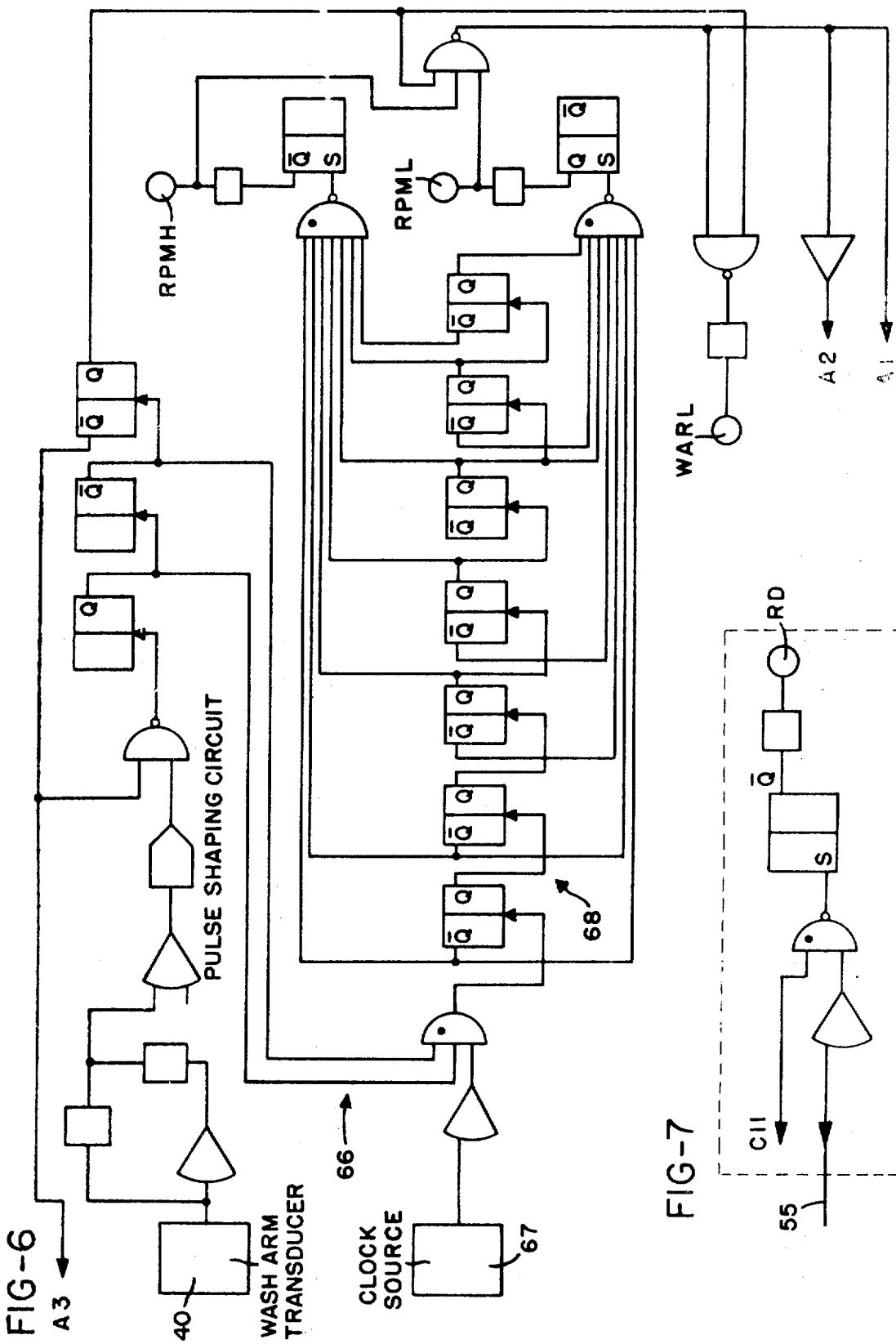

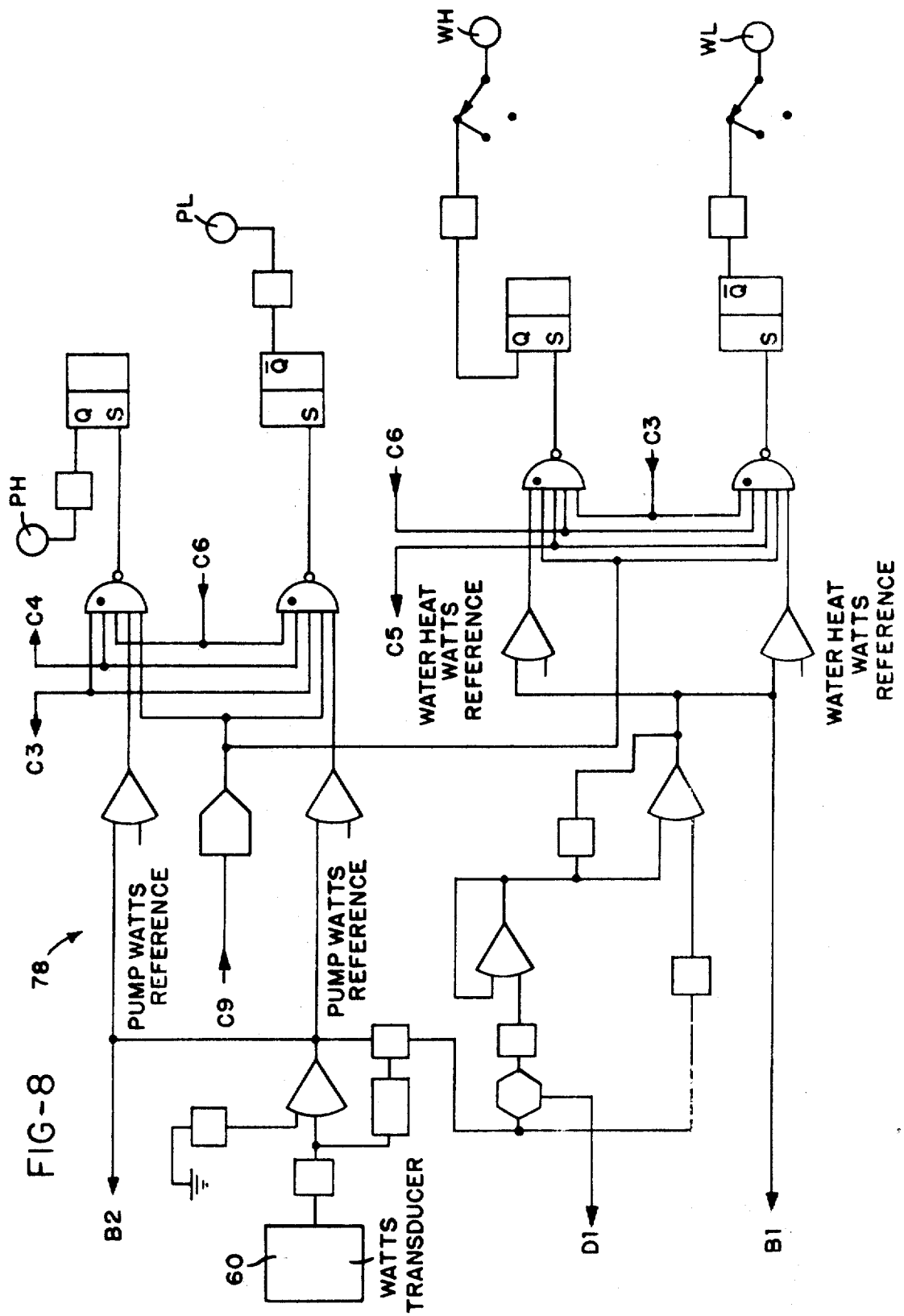

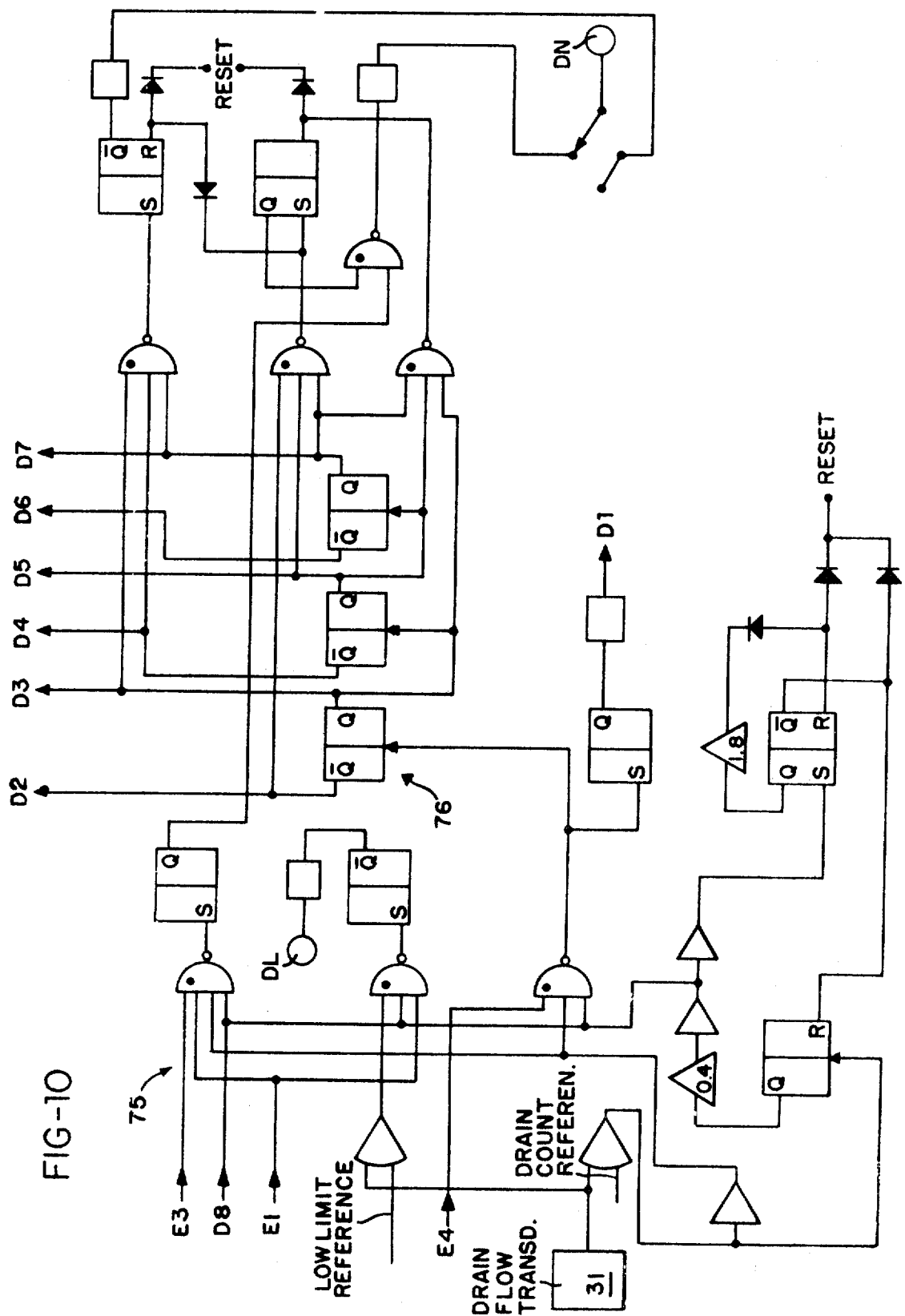

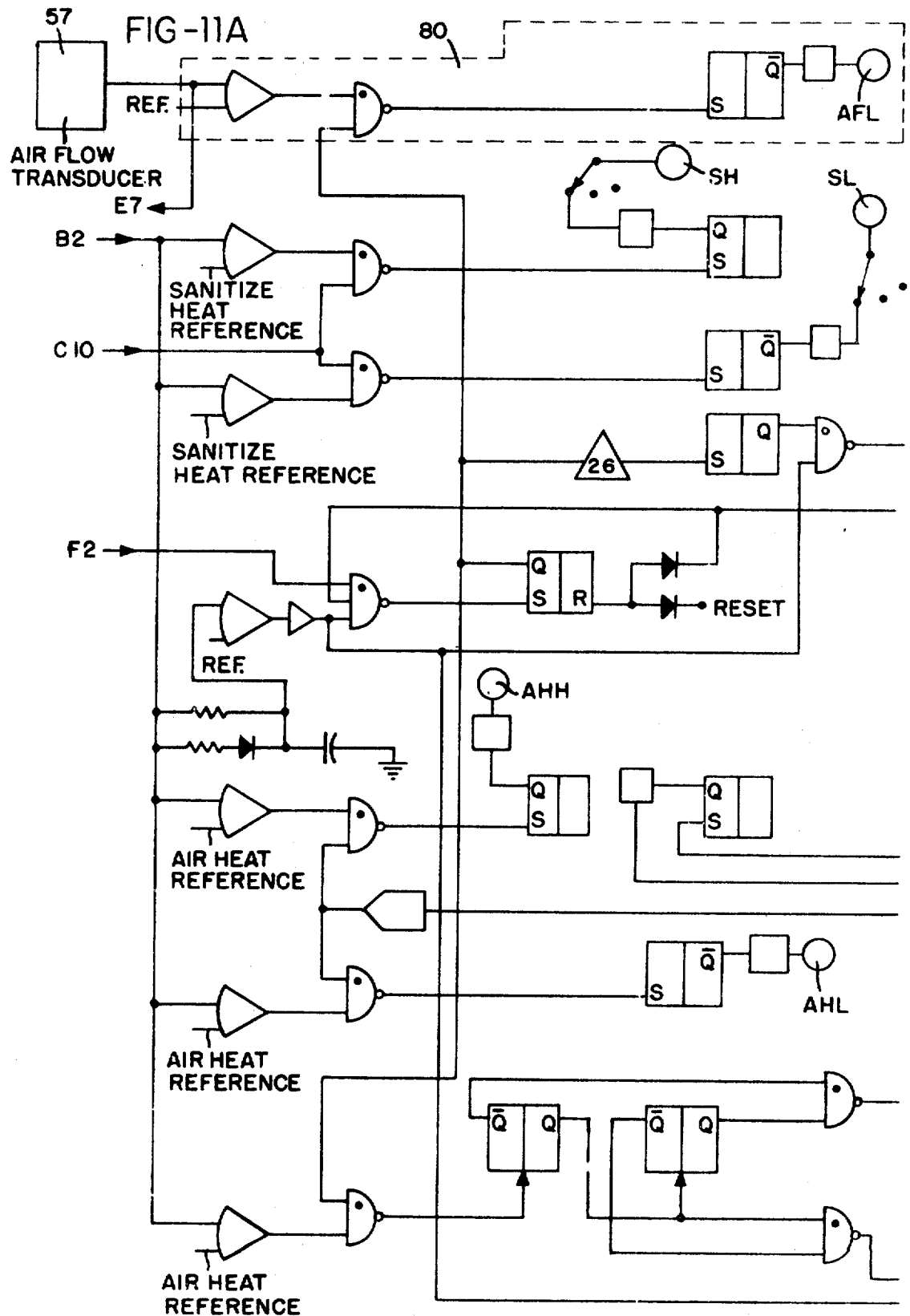

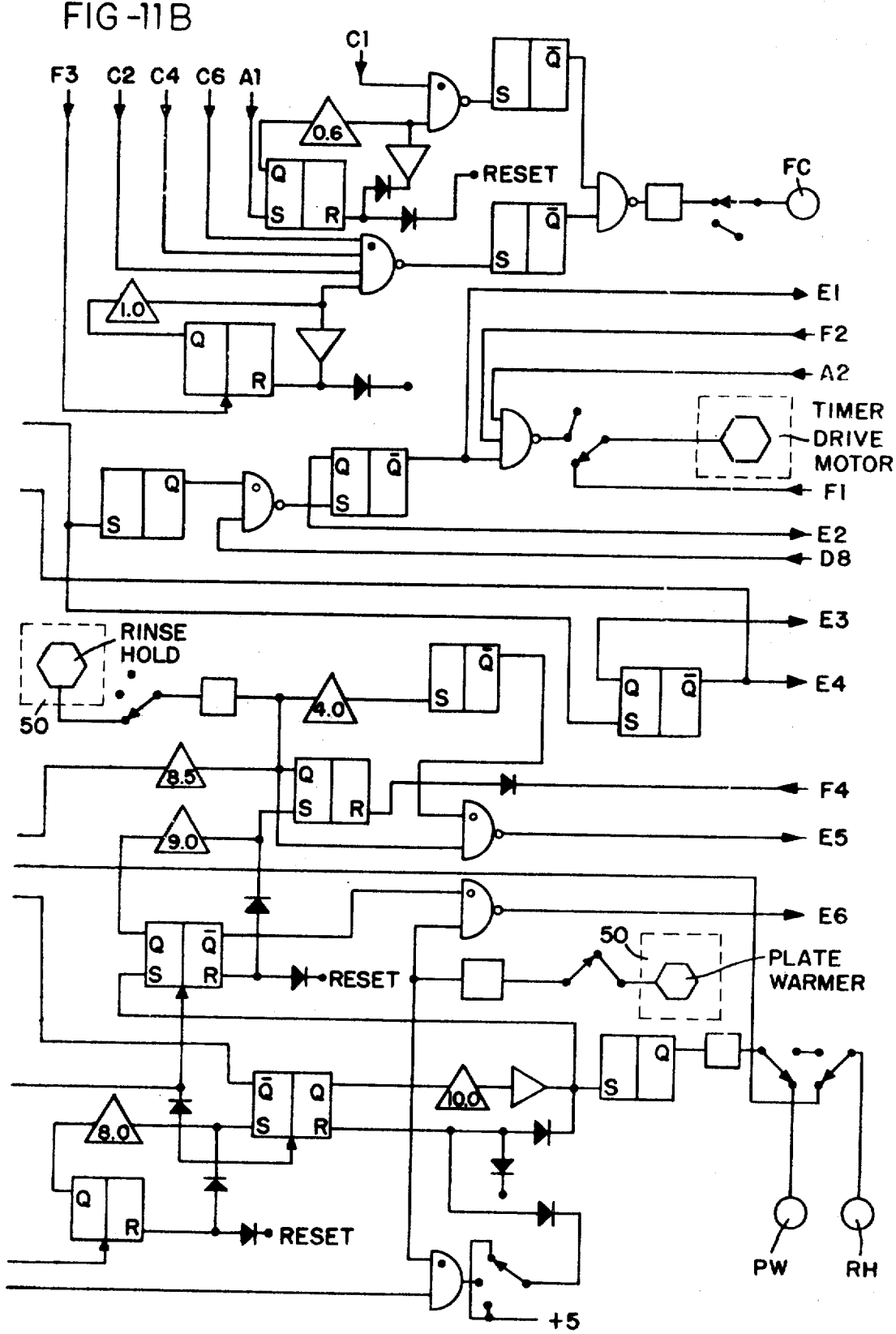

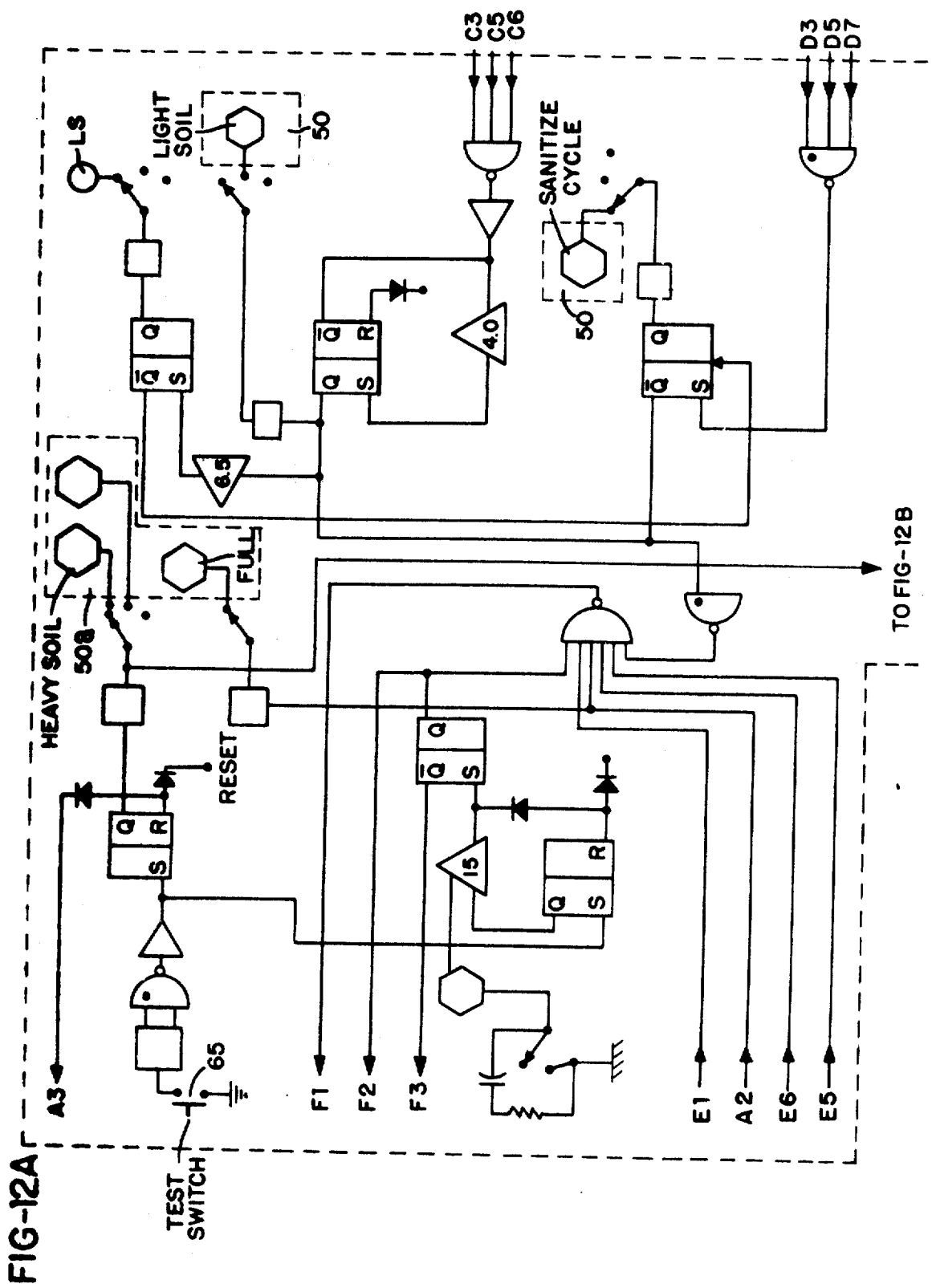

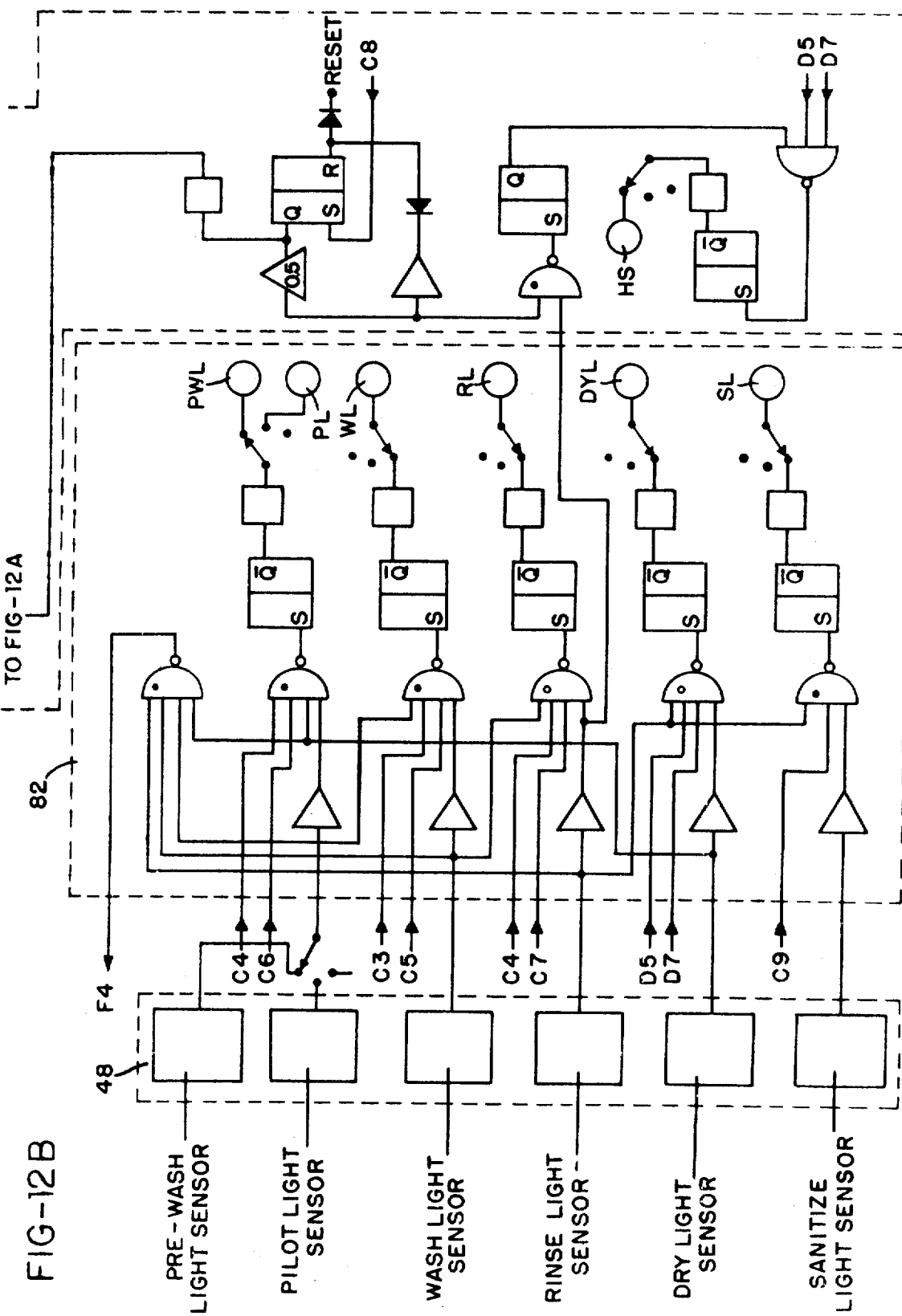

3,552,215
TESTER FOR TIMER CONTROLLED DEVICE
Stuart E. Athey, Troy, Ohio, assignor to The Hobart Manufacturing Company, Troy, Ohio, a corporation of Ohio
Filed Jan. 3, 1969, Ser. No. 788,902
Int. Cl. G01m 19/00
U.S. Cl. 73—432                                                    10 Claims

ABSTRACT OF THE DISCLOSURE

An apparatus for testing timer controlled devices such as dishwashers, having a timer mechanism which controls electrically the components of the device in a programmed sequence, includes an auxiliary timer drive motor which is temporarily connected to the internal timer to move it rapidly through its operating cycle, transducers connected to various components within the device to sense their operating conditions, circuit means sensing if any component deviates from its prescribed limits and if it operates at the proper time during the programmed sequence, and indicator lamps for specifically identifying any component which fails to operate properly.

BACKGROUND OF THE INVENTION

Timer control devices, such as dishwashers, washing machines, and the like, are often tested before they are packaged and shipped from the factory to insure that all of the components within the devices operate within prescribed limits and in accordance with a programmed sequence as determined by a timer motor. In a dishwasher, for example, a timer motor places the machine through a complete cycle of operation in approximately sixty minutes. Therefore, it is obviously impractical to allow the timer to control the testing operation by itself since an inordinate amount of time would be consumed for each unit tested.

Since most timers have a shaft on which is mounted a control knob and which is accessible from the outside of the dishwasher, it is possible to advance the timer manually and check whether the proper operations are being performed. However, this requires that an operator be present to move the timer through the program sequence. On those dishwashers which have timers located remotely, then manual operation of the timer becomes difficult, if not impossible.

Also, when using timer controlled devices, the shaft position of the timer cannot be used alone as a reference since manufacturing tolerances may cause one or more of the cams within the timer to be displaced from the shaft, and thus the cams may not actuate the proper switches exactly in accordance with the shaft position. Consequently, it is preferable to run the timer through its complete cycle of operation in its actual operating environment while monitoring for proper operation of the devices which the timer controls.

SUMMARY OF THE INVENTION

This invention relates to an automatic device for testing timer controlled devices, such as dishwashers, wherein transducers are installed to monitor the operation of certain components within the devices, and wherein the timer which controls the sequence of operation of these components is advanced rapidly through its cycle, usually under the control of an auxiliary motor which is temporarily attached to the drive shaft of the timer.

With this invention, the operator is required only to connect and disconnect test equipment to each dishwasher while the test function itself is performed automatically with indicator lights identifying any components in which failure occurs so that corrective action may be taken.

In the preferred embodiment of this invention, the dishwashers are brought to a test stand and connected to fill and drain lines which are attached to transducers sensing the rate of flow of water through these lines. Power is connected to the dishwasher through a transducer which measures the amount of power consumed by the device and which therefore indicates whether the motors and heater circuits within the device are functioning properly. On the dishwasher itself, a transducer is connected to measure the speed of rotation of the wash arm to insure that it is within prescribed limits. Another transducer is connected to the blower to insure that a sufficient quantity of air is being passed through the dishwasher at the proper time, and a timer drive motor is temporarily connected to the shaft of the dishwasher timer to cause the timer to be advanced rapidly through its cycle of operation. In addition, sensors are attached to monitor the operation of the indicator lights in their proper sequence, and on certain models of dishwashers, solenoids are attached temporarily to actuate the dishwasher control push buttons at specified times during the test sequence.

With these transducers and auxiliary devices attached to the dishwasher, the test sequence is initiated and the speed of rotation of the wash arm is sensed by a transducer. If the wash arm speed does not fall within prescribed limits, the operator will momentarily discontinue the test, adjust the wash arm jets, and restart the test. The fill flow control washer within the dishwasher is then checked by monitoring the rate of flow of water in the fill line by a venturi, across which is connected a pressure transducer. A similar transducer is located in the drain line to insure that the drain pump develops proper flow. At prescribed times during the testing sequence, the power to this dishwasher is monitored to determine if it is consuming the correct amount of power thus indicating that the heating elements and pumps within the apparatus are functioning properly.

Thus, all of the components in the dishwasher are monitored for proper operation, and in addition the tester circuit checks that these elements operate within prescribed times after the timer program calls for these operations to be performed.

It is therefore an object of this invention to provide an apparatus for testing timer controlled devices to insure that the various components within the device operate at the prescribed time within the timer sequence, and operate within predetermined limits; to provide an apparatus for testing dishwashers for assembly, wherein an auxiliary timer drive motor is attached to the dishwasher timer to advance that timer quickly through its operating cycle so that all of the functions which must be performed by a properly operating dishwasher may be sensed, both as to their operation at the proper time within the cycle, and to insure that all elements, such as heaters, consume power within prescribed limits.

These and other objects and advantages of the invention will be apparent from the following description, the accompanying drawings and the appended claims.

BRIEF DESCRIPTION OF THE DRAWINGS

FIG. 4A is a chart showing the power consumed by a properly operating dishwasher for each increment of rotation of the dishwasher timer motor and FIG. 4B shows the pilot lights illuminated during each increment;

FIG. 5 shows the electrical symbols used in the detailed schematic diagram of the dishwasher tester;

FIG. 6 is an electrical schematic diagram of the circuit checking the wash arm rotational speed;

FIG. 7 is an electrical schematic of the circuit testing the proper operation of the rinse dispenser;

FIG. 8 is an electrical schematic diagram of the circuit used in sensing the power consumed by various components of the dishwasher;

FIG. 10 is an electrical schematic diagram of the drain flow comparator and counter circuit;

FIGS. 11A and 11B, taken together, are electrical schematic diagrams showing the air flow comparator circuit and a portion of the tester control circuit;

FIGS. 12A and 12B, taken together, are electrical schematic diagrams showing the remainder of the tester control circuit, and the pilot light comparator circuit.

DESCRIPTION OF THE PREFERRED EMBODIMENT

Figure 1:
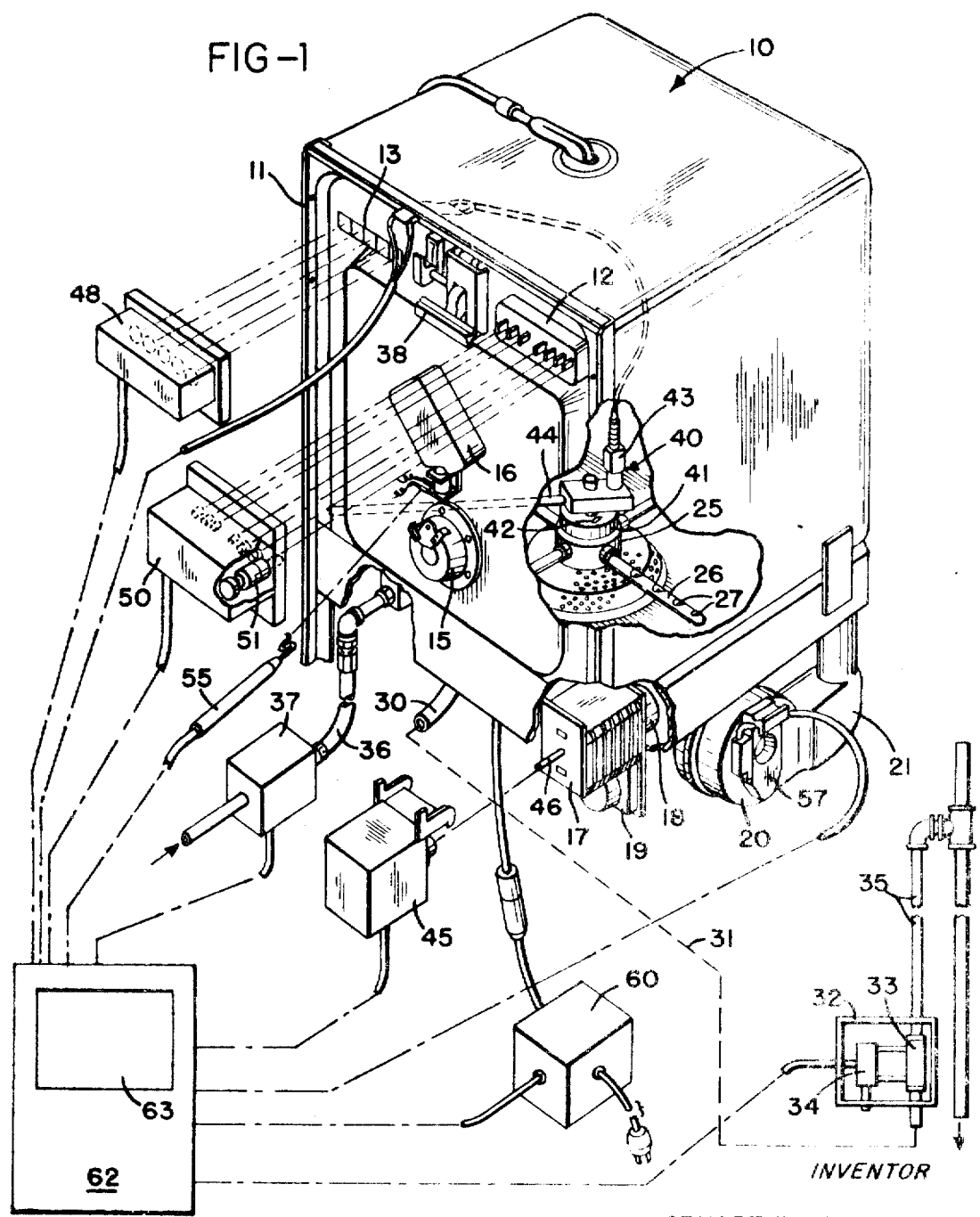
FIG. 1 is a pictoral view showing a typical dishwasher with the cover plates removed thus exposing the various components which are to be tested, the auxiliary timer drive motor and the transducers which are attached to these components, and with a portion of the dishwasher housing broken away to show the wash arm assembly and the transducer attached to the assembly.

Reference is now made to FIG. 1 where a dishwasher 10 is shown which has a door 11 hinged at the front of the dishwasher which includes in the door a set of push buttons 12 for selecting one of the dishwashing cycles, and a set of indicator lights 13 which reveal the stage of progress of the dishwasher through the selected cycle. A soap dispenser 15 and a rinse dispenser 16 are also included in the door. The cover on the door has not yet been installed.

In the dishwasher shown, a timer 17 is mounted underneath the dishwasher. This timer includes a drive motor 18 for moving the timer through the operating cycle, and a second motor 19 for advancing the timer rapidly through its cycle. On other model dishwashers, the timer is mounted on the door, and a shaft extends through the door cover. An external dial on the shaft shows the operating position of the timer and may be turned by the user to select a desired portion of the operating cycle.

Mounted underneath the dishwasher is an air blower 20 which blows air through a heater, located generally at 21, and into the interior of the dishwasher 10 to assist in drying the contents. Located within the dishwasher is a wash arm assembly 25 which includes a plurality of wash arms 26 each having openings 27 therein through which water is pumped to cause the wash arm to rotate and direct the water jets upwardly.

When a dishwasher passes the test position, the operator moves it into place and connects the drain line 30 to a hose 31 in which is installed a drain flow transducer 32. This trasducer includes a venturi 33 and a pressure transducer 34. The water in the drain line 31 must be pumped by the dishwasher up a pipe 35 before being permitted to discharge from the line. This insures that the dishwasher pump is able to purge the water from the dishwasher at a specified rate while working against a head.

The operator also connects the dishwasher to a fill line 26 in which is installed a flow transducer 37. The fill flow transducer 37 is similar in its construction to the drain flow transducer 32.

The operator then opens the door by means of handle 38 and installs a wash arm rotation speed transducer 40 on the wash arm assembly 25. This transducer includes a member 41 holding a magnet 42 which mounts on the wash arm to rotate therewith. A magnetic pickup 43 senses the passage of the magnet 42 and produces an electrical pulse for each revolution of the wash arm assembly 25. The transducer 43 is prevented from rotating by an arm 44 which extends to the side of the inner housing of the dishwasher.

An auxiliary timer motor 45 is installed over a shaft 46 which extends from the timer 17 so that the timer motor can be advanced rapidly through its operating cycle. An indicator light detector assembly 48, which includes a plurality of photosensitive means, such as photodiodes, is installed over the dishwasher indicator lights 13. A push button actuator assembly 50, which includes a set of electrical solenoids, one for each push button switch on the door, is installed over the push button assembly 12 and therfore permits the automatic actuation of any one of the push buttons on the dishwasher. Of course, on those devices which do not use push buttons to control the operation thereof, this push button assembly is not needed.

An electrical contact 55 is installed on one of the terminals of the solenoid which actuates the rinse dispenser 16 to indicate when the voltage is applied to that device. An air flow transducer 57 is installed to sense the flow of air into the blower 20. The air flow transducer, in the preferred embodiment, includes a thermistor which is self-heating to about 150° C. The cooling of this transducer from its normal operating temperature indicates the amount of air flow. In some cases, it may be necessary to provide thermal shielding means to prevent the heat from coils 21 from influencing the thermistor and giving an erroneous reading on the quantity of air flow.

Thus, transducers are connected to the individual elements of the dishwasher, these elements including the wash arm, the air blower, the fill and drain lines, the rinse dispenser, and the pilot lights. Finally, the dishwasher is connected to a source of power through a watts transducer 60. In the preferred embodiment of the invention, the Model 1156 transducer (Scientific Columbus, Inc.) is used. This transducer supplies a D.C. output voltage which is proportional to the power consumed by the dishwasher.

Each of the transducers, actuators and the auxiliary timer drive motor is electrically connected to the dishwasher test device, shown generally at 62, and any malfunctions within the dishwasher are displayed by lights on indicator panel 63.

Figure 2:
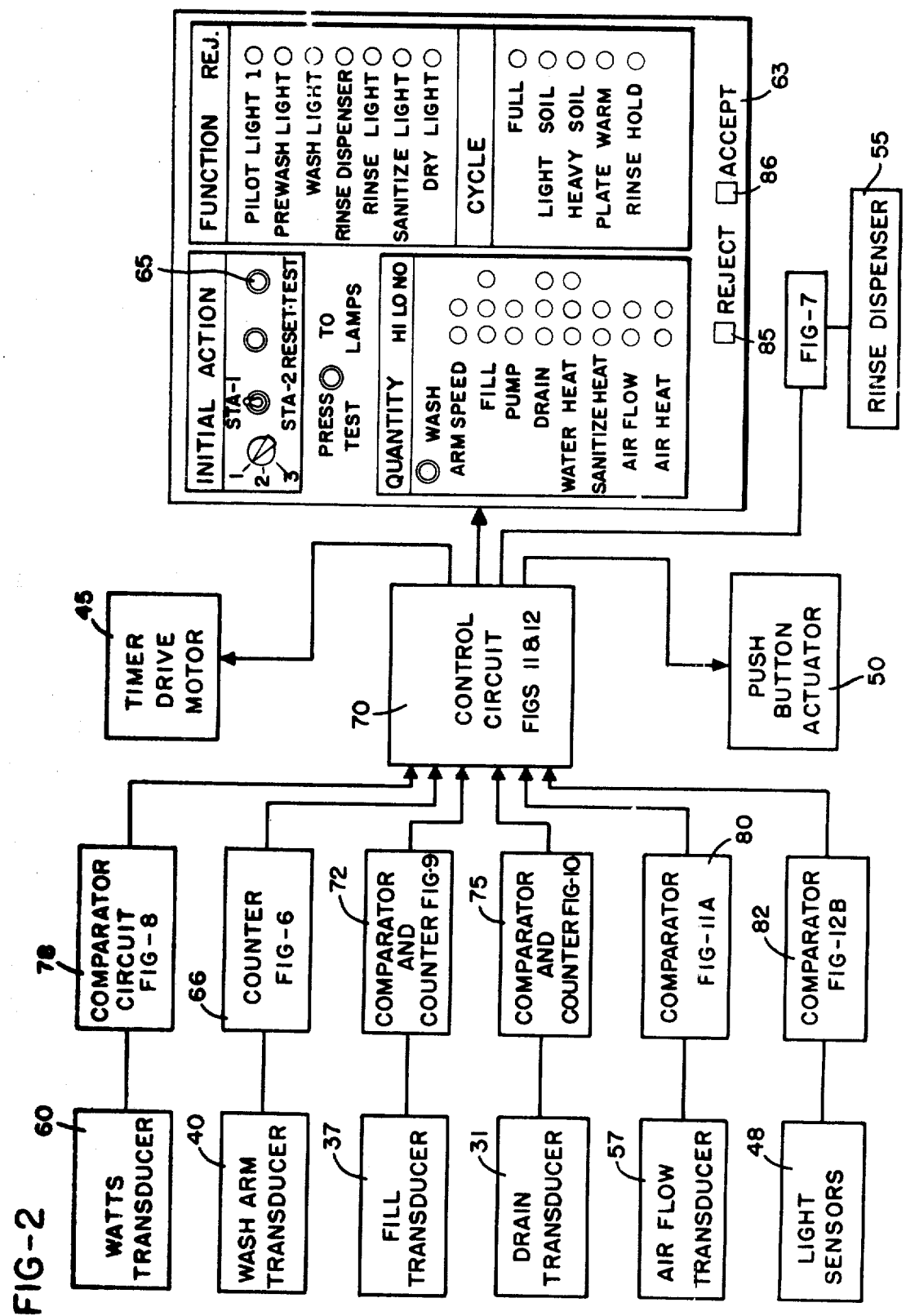
FIG. 2 is a block diagram of the dishwasher tester circuit.

FIG. 2 is a block diagram showing generally the interconnection between the transducers, the control circuit, the auxiliary timer drive motor, the push button actuator, and the indicator panel. A more complete illustration of these circuits may be found in the electrical schematic diagrams of FIGS. 6 through 13. However, a detailed description of the circuits will not be undertaken since it will be immediately apparent to those skilled in the art how these circuits work once the function of each is explained.

The tester apparatus of this invention will be described with reference to testing a Hobart Model KDS–16 dishwasher, which is described generally in Pat. Nos. 3,285,471 and 3,323,329. The timer of this type of dishwasher includes twelve cams, the function of each being shown in the timing chart of FIG. 3. Of course, only selected cams are used in any one of several programmed sequences available.

The power consumed by the Model KDS–16 dishwasher for each interval of the timer motor is shown in FIG. 4A while the lights which are energized during a complete cycle of operation are illustrated in FIG. 4B.

After the transducers and actuators have been installed on the timer, the operator depresses momentarily a test button 65 which initiates the operating cycle. At this time, the heavy soil cycle button is depressed by action of the push button actuator 50a (FIG. 12) which starts the dishwasher. The output from the wash arm transducer 40 is applied to a counter circuit 66 shown in FIG. 6 which determines whether the wash arm rotational speed is between specified limits. In the preferred embodiment, this is done by supplying a series of clock pulses from a source 67 to a counter 68, gating the counter into operation during the third revolution of the wash arm, then gating the counter off upon the occurrence of a fourth revolution, and determining the number within the counter. If the wash arm speed is too high, the RPMH lamp will be illuminated. and if the wash arm speed is too low, the RPML lamp will be illuminated. If either of these lamps remains on, the WARL lamp will light and the test discontinued until the operator adjusts the jets 27 on the wash arm 26 to provide the proper wash arm speed.

If the wash arm rotational speed is within prescribed limits, a signal is applied on line A1 to the control circuit 70, shown in FIGS. 11 and 12, and the remainder of the test cycle in initiated.

The interconnection among the electrical schematics of FIGS. 6 through 12 is as follows: Any line carrying a signal originating in FIG. 6 is prefixed with the letter A, and any lines carrying signals originating in FIGS. 8 through 12 are prefixed with the letters B through F, respectively. Thus, the output from FIG. 6 on line A1 will be found as an input line A1 at the upper left in FIG. 11B, while an output E1 from the control circuit (upper right of FIG. 11B) is applied to the circuit shown in FIG. 9 (upper left).

After the wash arm rotational speed test, the full cycle button is actuated and the timer is advanced rapidly by its own rapid advance motor past the first and fill and drain periods. Therefore, these functions will have to be checked during the second cycle of the dishwasher timer.

Figure 3:
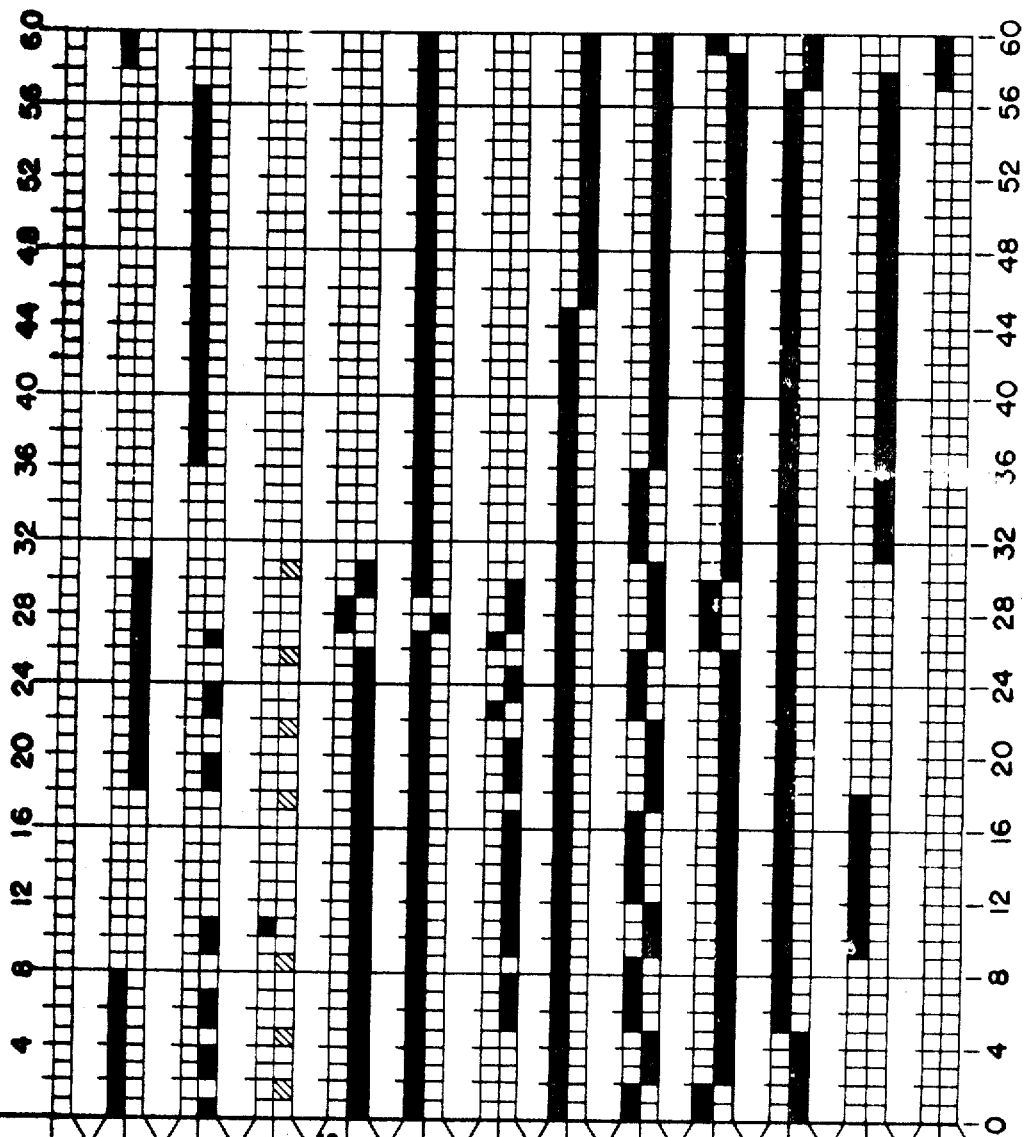
FIG. 3 is a timing chart showing the operations performed by each of the cams of the dishwasher timer motor.
Figure 9:
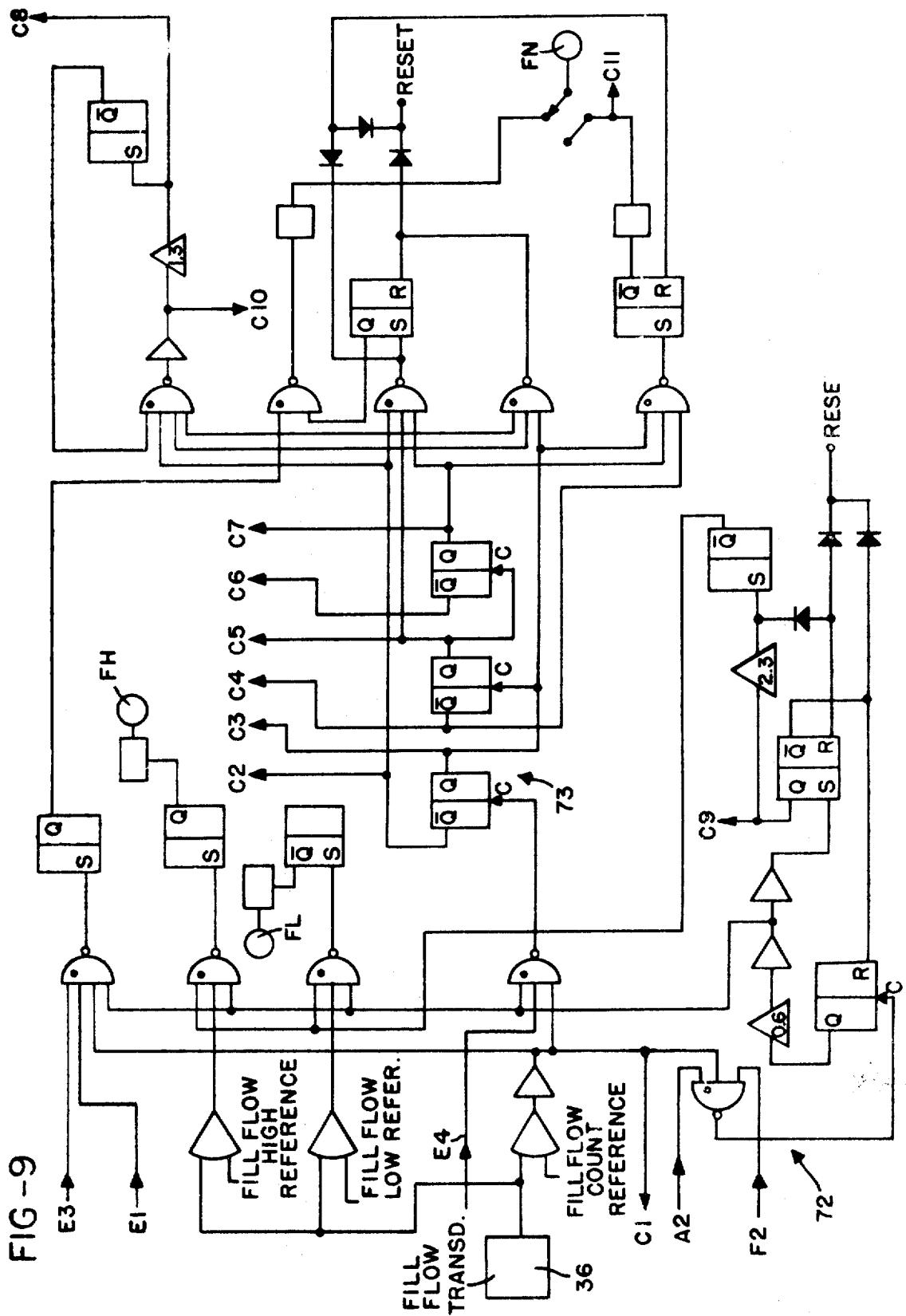
FIG. 9 is an electrical schematic diagram of the fill flow comparator and counter circuit.

As shown in the timing chart of FIG. 3, a total of seven fill and seven drain periods are required for a complete operational cycle of the dishwasher described herein. During each of thse periods, the dishwasher is tested for the proper flow rate. The output of the fill transducer 37 is applied to a comparator and counter circuit, shown in detail in FIG. 9, and the magnitude of the transducer signal is compared to reference voltages. If the fill flow rate is too high, the FH lamp will light, and if it is too low, the FL lamp will light. The fill flow rate is therefore checked to insure that the fill flow control washer is functioning properly.

The number of fill periods is also determined by a counter circuit, and if the number of periods is incorrect after the test is completed, the FN lamp will remain on. The fill flow counter, which includes three flip-flops shown gentrally at 73, also has outputs which are applied to the control circuit to cause other testing functions, such as the pilot light check, to occur at the proper time within the dishwasher cycle.

Similarly, the drain flow transducer 31 has its output connected to a comparator and counter circuit 75, shown in FIG. 10, and if the flow rate in the drain line is below a predetermined reference value, the DL lamp will light. The circuit 75 also includes a counter shown generally at 76, the output of which is applied to portions of the control circuit, and a drain number indicator lamp DN which will remain energized if an insufficient number of drain periods is performed by the dishwasher at the completion of the test.

The output of the air flow transducer 57 is applied to the comparator circuit 80, shown in FIG. 11A, and if the air flow is too low, the AFL lamp will remain energized.

The light sensors 48 which sense the operation of each of the pilot lamps 13, are connected to a comparator circuit 82, shown in FIG. 12B, and each light must be energized at the proper time during the cycle of operation, as represented by either the drain counter or the fill counter, and if these pilot lights fail to operate at the required time an error will be indicated by lighting an appropriate indicator lamp.

The rinse dispenser probe 55 senses when voltage is applied to the rinse dispenser solenoid, and if this occurs at the proper time, the RD lamp (FIG. 7) will be deenergized.

The watts transducer 60 has its output connected to a comparator circuit 78, shwon in FIG. 8, which determines whether the power consumed by the dishwasher at various times within the cycle falls within predetermined limits as provided by reference voltages to comparator circuits. The circuit 78 determines the power consumed by the pump, and if it is too high, the PH lamp will light, and if too low, the PL lamp will light. The circuit 78 also provides means to measure the power used by the water heater coils independently of the power consumed by the pump, and if the water heat power is too high, the WH lamp will light, and if too low, the WL lamp will light. FIG. 4A shows the power consumed for each timer interval during the dishwasher cycle.

The dishwasher is tested for power consumption by supplying an enabling signal after the second complete fill cycle to the circuit at the upper right in FIG. 8. If the power consumed by the dishwasher, as indicated by the watts transducer 60 is within the limits established by the pump watts reference voltages, both lamps PH and PL will extinguish. Referring to FIG. 4, the power being measured at this time is that which is consumed by the dishwasher during interval 4 and represents the power consumed by both the pump motor and the fill valve.

This power level is also applied to an operational amplifier network, shown at the lower right in FIG. 8. This circuit subtracts the power consumed by the pump and fill valve from the power consumed during the third fill cycle, interval 6, to give an indication of the power consumed by the water heater alone. The output of this network is supplied to indicator lamps WH and WL which indicate whether the power consumed was within the limits established by the water heat reference voltages.

Referring to FIG. 11A, the output of the watts transducer is also applied on line B1 where it is compared to a reference voltage during the 27th interval to check the power consumed by the sanitizing heater coil, and if it is within predetermined limits, lamps SH and SL will extinguish. Also, the air heater coil is monitored by the watts transducer after the 36th interval, and if the power is within prescribed limits, both lamps AHH and AHL will extinguish.

Figure 13:
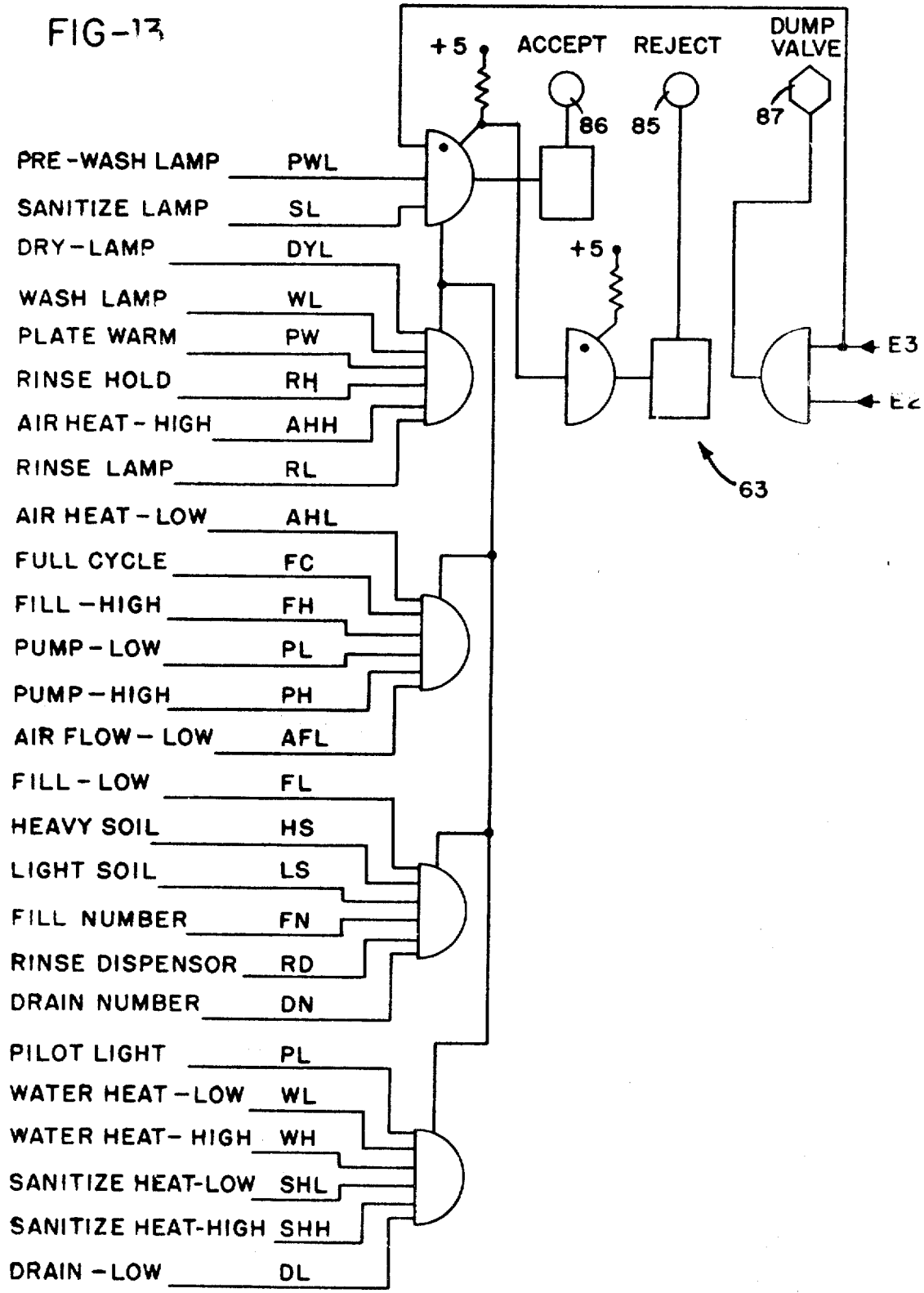
FIG. 13 is the electrical schematic diagram of the circuit which indicates whether the dishwasher undergoing test should be accepted or rejected.

With reference to FIG. 13, each of the indicator lamps described above is also connected to a plurality of circuits, and at the end of the test, if any one of these lamps remains energized, an output from these gate circuits will cause the "reject" lamp 85 to light to alert the operator to the fact that a component has malfunctioned in the dishwasher. The nature of the malfunction may be determined by observing which lamp remains energized. If all the lamps at the end of the testing cycle are deenergized, the "accept" lamp 86 will energize to ind'cate that the dishwasher test has been satisfactorily performed.

A dump valve 87, shown at the upper right in FIG. 13, is actuated at the conclusion of the testing sequence to drain the dishwasher rapidly. The dump valve permits the water within the dishwasher to exit directly to a drain rather than through the flow transducer and against the head provided by pipe 35.

Thus, the operation of the automatic testing device has been described broadly. In summary the following items are checked on the Hobart Model KDS-16 dishwasher:

(1) The wash arm rotation speed.
(2) Fill periods must be counted, and the flow rate is checked.
(3) Drain periods must be counted and the minimum flow rate is checked.
(4) Power consumption for the pump motor, water heater, the air heater and the blower motor.

(5) The air flow rate is observed for minimum flow.
(6) The operation of the rinse dispenser after the fifth fill is observed.
(7) The indicator lamps are checked as follows:
   (a) The prewash lamp must be on at the second fill.
   (b) The wash lamp must be on at the fourth fill.
   (c) The rinse lamp must be on at the sixth fill.
   (d) The sani-lamp must be on during the first increment after the seventh fill.
   (e) The dry lamp must be on after the seventh drain.
(8) The following cycle options are checked:
   (a) Full cycle.—Sampled at first fill and timer must rapid advance on own to second fill and obtain actual fill indication to indicate proper operation.
   (b) Light soil cycle.—Sampled after fourth fill in the middle of the main wash cycle. The timer must rapid advance on own and cause the fourth drain operation within time allowed or an error will be indicated.
   (c) Sanitizing cycle.—Sampled during the increment following the seventh fill. Proper operation is indicated by the sanitizing lamp being on and the rinse lamp being out at this time.
   (d) Heavy soil cycle.—Sampled during the sanitize heat increment. Sanitizing lamp must go out and rinse lamp come on and seventh drain operation obtained for proper indication.
   (e) Plate warm cycle.—Sampled eight increments after air heat comes on. Timer must rapid advance on own with air heat off and, in the time allowed, the air heat must come back on or error is indicated.
   (f) Rinse hold cycle.—Sampled nine increments after plate warm cycle. Timer must rapid advance on own in the time allowed to the end of the drying cycle, or otherwise an error will be indicated.

While the preferred embodiment has been described for use with a dishwasher such as Hobart Model KDS–16, it will become apparent to those skilled in the art that the same inventive concepts may be used with other types of dishwashers which have fewer operating modes or with other timer control devices such as washing machine, dryers, etc.

While the form of apparatus herein described constitutes a preferred embodiment of the invention, it is to be understood that the invention is not limited to this precise form of apparatus, and that changes may be made therein without departing from the scope of this invention.

What is claimed is:

1. Apparatus for testing timer controlled devices having a plurality of individual elements which operate in a predetermined sequence, said apparatus including:
   transducer means connected to the individual elements of the device for providing an output signal indicative of the operation of that element;
   a plurality of comparator means receiving an input from said transducer means and for comparing each said input to a reference;
   control circuit means including a plurality of gate means operable to sense the output of selected comparator means according to the progress of the device through its predetermined sequence; and
   indicator means responsive to said comparator means for indicating a failure of an individual element to produce a transducer output acceptable with respect to its reference.

2. The apparatus of claim 1 wherein said control circuit senses the operation of at least one of said individual elements to operate said gate means in said predetermined sequence.

3. The apparatus of claim 1 further including:
   counter means connected to the output of selected transducer means to indicate the number of operations performed by a selected element within the device; and
   indicator means responsive to the output of said counter means to indicate a failure of said selected element to perform the required number of operations during the programmed sequence.

4. The apparatus of claim 1 further including:
   auxiliary timer drive means attached to the timer within the device and actuated by said control circuit for causing the timer to advance rapidly through its programmed sequence.

5. The apparatus of claim 4 wherein said auxiliary timer drive means is selectively actuated by said control circuit so that the timer within said device is allowed to advance independently of said auxiliary timer drive means at prescribed times during the testing sequence to determine if the timer is operating properly, said apparatus further including:
   means within said control circuit means to provide a time delay,
   comparator means selected by said control circuit means and responsive to a selected transducer for determining if the operation of said selected transducer occurs within said time delay; and
   indicator means responsive to the output of said comparator means to indicate a failure of said timer to operate properly.

6. The apparatus of claim 1 wherein said timer controlled device includes a plurality of switches for selecting one of a plurality of different programmed sequences of operation;
   wherein said tester apparatus includes switch actuators so mounted on the device that they operate said switches selectively in response to said control circuit means to test the proper operation of the switches and the elements associated therewith;
   wherein the timer within the device includes a rapid advancing motor capable of moving the timer rapidly through a portion of its sequence until it reaches the sequence selected by the actuated switch;
   means within said control circuit to provide a time delay;
   comparator means responsive to said control circuit for sensing the output of a selected one of said transducers after said time delay to determine if the timer causes the proper operation of that element as sensed by said selected transducer within said time delay period; and
   indicator means responsive to the output of said comparator means for indicating failure of the timer to advance the programmed sequence within the time delay period.

7. The apparatus of claim 1 further including transducer means for sensing the power consumed by said device;
   comparator circuit means responsive to said transducer and to the operation of said control circuit means for sensing whether the power consumed by the device at various times during the programmed sequence falls within predetermined limits; and
   indicator means responsive to said comparator means for indicating a failure of the device to consume power within said prescribed limits.

8. Apparatus for testing machines such as dishwashers including automatically operable fill and drain controls, a motor operated pump means for circulating cleansing liquid, a control selector and a timer operable by said selector and operative to actuate said controls and pump means in a predetermined sequence, said apparatus comprising:
   drive means adapted for temporary connection to the timer to drive the same rapidly through the operating cycle of the machine;
   a plurality of transducers operative to sense at least fill, drain, control selector mode, and electrical power consumption, respectively;

a plurality of comparator circuits having inputs from said transducers and each having a reference input to which the inputs from said transducers are compared;

a control circuit including gating devices operative to control said drive means and to actuate said comparator circuits according to progress of the machine through its operating cycle; and indicators responsive to said comparator circuits arranged to indicate failure of the machine to produce transducer outputs acceptable with respect to the reference inputs.

9. The apparatus of claim 8 wherein said control circuit senses the operation of at least one of the machine components to operate said gating devices in said predetermined sequence.

10. The apparatus of claim 9 wherein the operation of the fill and drain controls are monitored to operate said gating devices in said control circuit.

References Cited

UNITED STATES PATENTS

| | | | |
|---|---|---|---|
| 2,728,890 | 12/1955 | Zimmerman | 73—1(A) |
| 2,768,369 | 10/1956 | Adelson | 340—223 |
| 3,183,599 | 5/1965 | Byrd et al. | 73—1(A)X |

S. CLEMENT SWISHER, Primary Examiner